United States Patent
Beach et al.

(10) Patent No.: US 9,841,562 B2
(45) Date of Patent: Dec. 12, 2017

(54) FIBER DEVICES WITH DISPLACEABLE FIBER GUIDE

(75) Inventors: Kevin C. Beach, Haltom City, TX (US); Daniel Leyva, Jr., Arlington, TX (US); David W. Meek, Ft. Worth, TX (US); Jackie E. Thomison, Ft. Worth, TX (US); Ashley W. Jones, Denton, TX (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 1468 days.

(21) Appl. No.: 12/755,895

(22) Filed: Apr. 7, 2010

(65) Prior Publication Data
US 2011/0247473 A1    Oct. 13, 2011

(51) Int. Cl.
*G02B 6/25*    (2006.01)
*G02B 6/255*   (2006.01)

(52) U.S. Cl.
CPC .............. *G02B 6/25* (2013.01); *G02B 6/2553* (2013.01); *Y10T 83/0207* (2015.04); *Y10T 83/0333* (2015.04); *Y10T 225/321* (2015.04)

(58) Field of Classification Search
CPC ........ G02B 6/224; G02B 6/25; G02B 6/2553; G02B 6/245; C03B 37/16; Y10T 83/207; Y10T 83/0333; Y10T 83/0341; Y10T 225/12; Y10T 225/30; Y10T 225/307; Y10T 225/321; Y10T 225/325
USPC ........... 225/94, 96, 96.5, 2, 93; 65/433, 501, 65/536; 83/862, 879, 880
See application file for complete search history.

(56) References Cited

U.S. PATENT DOCUMENTS

| | | | | |
|---|---|---|---|---|
| 4,216,004 A | * | 8/1980 | Brehm et al. ............ | G02B 6/25 225/2 |
| 4,257,546 A | * | 3/1981 | Benasutti ..................... | 225/96.5 |
| 5,024,363 A | * | 6/1991 | Suda et al. ............... | G02B 6/25 225/2 |
| 5,210,647 A | | 5/1993 | Harnagel et al. ............. | 359/802 |
| 5,351,333 A | | 9/1994 | Chambers ..................... | 385/134 |
| 5,353,366 A | | 10/1994 | Bossard ........................ | 385/134 |
| 5,382,276 A | * | 1/1995 | Hakoun et al. .......... | G02B 6/25 225/2 |
| 5,838,850 A | | 11/1998 | Mansfield et al. ............ | 385/134 |
| 6,628,879 B2 | | 9/2003 | Robinson et al. ............ | 385/134 |

(Continued)

FOREIGN PATENT DOCUMENTS

| | | | | |
|---|---|---|---|---|
| DE | 202008002887 U1 | 5/2008 | ............... | G02B 6/25 |
| EP | 0568112 A2 | 11/1993 | ............... | G02B 6/25 |
| GB | 2147577 A | 5/1985 | ............... | C03B 37/16 |

*Primary Examiner* — Clark F Dexter
(74) *Attorney, Agent, or Firm* — Adam R. Weeks (57) ABSTRACT

A fiber cleaver having a displaceable fiber guide for aligning and guiding an optical fiber. Generally, the fiber cleaver includes a pair of clamps that may articulate between a retracted position and a clamping position. A displaceable fiber guide directs the optical fiber as it travels along an internal path of the fiber cleaver. The fiber guide translates between a loading position and a clamping position. When the clamps are securing the optical fiber to the internal path, a linear actuator may be depressed in order to translate the fiber guide and ultimately direct the optical fiber toward a scoring blade to cleave the fiber. The fiber guide is sized and shaped such that a predetermined length of optical fiber will remain after cleaving.

12 Claims, 5 Drawing Sheets

(56) References Cited

U.S. PATENT DOCUMENTS

| | | |
|---|---|---|
| 6,978,071 B2 | 12/2005 | Hwang et al. .............. 385/134 |
| 7,116,882 B2 * | 10/2006 | Watte et al. ................ 385/134 |
| 7,305,169 B2 | 12/2007 | Honma ....................... 385/136 |
| 7,391,951 B2 | 6/2008 | Hayashi et al. ............. 385/134 |
| 7,428,365 B1 | 9/2008 | Brinson et al. ............. 385/137 |
| 7,539,389 B2 | 5/2009 | Brinson et al. ............. 385/137 |
| 7,809,231 B2 * | 10/2010 | Pracklein et al. ....... G02B 6/25 385/134 |
| 2004/0129571 A1 | 7/2004 | Onosato ...................... 205/160 |
| 2009/0220203 A1 | 9/2009 | Pracklein et al. |

\* cited by examiner

FIBER DEVICES WITH DISPLACEABLE FIBER GUIDE

BACKGROUND

The present disclosure generally relates to field installable optical equipment and related installation tools, and in particular fiber receiving devices, for one example, fiber cleavers.

In order to properly cleave an optical fiber, the optical fiber must be precisely positioned relative to a set of critical components within a fiber cleaver, such as a fiber alignment element, a fiber gripping surface, a scoring blade, and a cleaving anvil. The majority of fiber cleavers currently available are a "clam shell" or "open" type design. Clam shell or open type fiber cleavers are such that the set of critical components are visually exposed and permit the operator to visually verify that the optical fiber is properly positioned relative to the critical components when the optical fiber is placed in the cleaver. Oftentimes as a result of the clam shell or open design, a plurality of components are exposed and it is often unclear to the operator exactly where the fiber should be placed. It is therefore common for an operator to place the fiber in the cleaver incorrectly which typically results in an unacceptable cleave. Furthermore, this positioning error is particularly common with inexperienced operators, operators with poor vision, or during use in a poorly lit environment.

SUMMARY

In accordance with one aspect of the present disclosure, a fiber handling device, for example, a fiber cleaver, configured to facilitate cleaving an optical fiber is disclosed. The fiber cleaver comprises a housing defining an internal path along which an optical fiber can extend. A scoring blade is arranged within the housing and on one side of the internal path. An anvil is arranged within the housing on an opposite side of the internal path. The scoring blade and anvil may be selectively movable into engagement with each other for cleaving an optical fiber extending along the path.

At least two clamps associated with the scoring blade may be selectively movable between a clamping position and a retracted position. The clamping position may be to clamp an optical fiber extending along the path and the retracted position may be displaced from the path for receiving the optical fiber. A fiber guide may be disposed at least partially between the clamps and formed with at least one guide section. The fiber guide may be movable between a loading position wherein the path extends within the guide section and a cleaving position wherein the guide section is displaced from the path. The fiber guide may be moved to its loading position when the clamps are moved to their retracted positions to guide an optical fiber through the cleaver within the guide section and along the path. The fiber guide may be moved to its cleaving position when the clamps are moved to their clamping positions to suspend the optical fiber freely between the clamps to be cleaved when the scoring blade and anvil are moved into engagement with each other.

In accordance with another aspect of the present disclosure, a fiber guide for an optical fiber cleaver is disclosed. The fiber guide comprises a body configured to be received in the optical fiber cleaver. The body has a first end portion, a second end portion, and a mid portion. The mid portion is sized and shaped to accommodate a scoring blade of the optical fiber cleaver. The first end portion defines a first elongated slot sized to receive and guide an optical fiber and the second end portion defines a second elongated slot sized to receive and guide an optical fiber. The first and second guide slots are aligned to suspend a portion of the optical fiber extending within the guide slots across the mid portion of the fiber guide to be cleaved by the scoring blade.

In accordance with yet another aspect of the present disclosure, a method of cleaving an optical fiber is disclosed. The method comprises at least the steps of:
(a) advancing the optical fiber through at least one guide slot to position the optical fiber along a path;
(b) clamping the optical fiber at spaced locations along the path while moving the slot away from the optical fiber to suspend the optical fiber freely between the spaced locations;
(c) engaging the optical fiber with a scoring blade and an anvil at a position between the spaced locations to cleave a waste portion from the optical fiber; and (d) removing the waste portion of the optical fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Reference is now made to embodiments of the disclosure, exemplary embodiments of which are illustrated in the accompanying drawings. In the description below, like elements and components are assigned like reference numbers or symbols.

The present disclosure is directed to a fiber guide for use in conjunction with a fiber handling device, for example, a fiber cleaving tool. Another aspect of the present disclosure is the use of a fiber cleaver to cleave a plurality of different fiber optic cable constructions. Although disclosed primarily within the context of a fiber guide for use with a fiber cleaving tool, the skilled artisan will recognize that the principles of the present disclosure are not limited to a fiber guide for use with a fiber cleaving tool but extend to any type of tool wherein optical fibers require alignment before being treated in some way.

Figure 1:
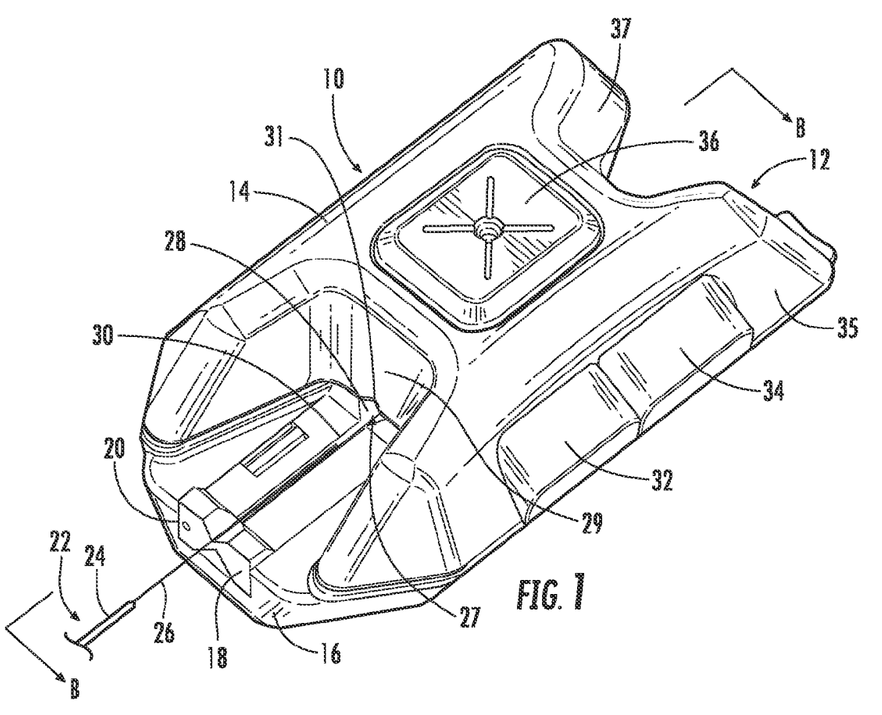
FIG. 1 is an isometric view showing a fiber cleaver according to a first embodiment of the disclosure.

FIG. 1 is an isometric view showing a fiber device in the form of a cleaver 10 according to a first embodiment of the disclosure. The fiber cleaver 10 comprises an upper body 14 in contact with a lower body 16 to form a tool body 12. The tool body 12 may be ergonomically designed to fit comfortably within a user's palm or hand. The fiber cleaver 10 may further comprise a receiving bay 20 to house and support a fiber handling tool 18. When installed, the fiber handling tool 18 may be approximately flush with an entry end 29 of the fiber cleaver 10. The fiber handling tool 18 may facilitate alignment of an optical fiber 26 of a fiber optic cable 22, wherein the optical fiber 26 is to be inserted into a fiber entry location 27 of the fiber cleaver 10. The fiber handling tool 18 may comprise a channel 30 sized and configured to accommodate the fiber optic cable 22, a coating 24 of the optical fiber 26, and/or the optical fiber 26. The fiber entry location 27 may be arranged proximate the entry end 29 of the fiber cleaver 10. The fiber entry location 27 may be a funnel shaped entry 28 to facilitate insertion and guidance of the optical fiber 26 into the fiber cleaver 10. The funnel shaped entry 28 may be established when the channel 30 of the fiber handling tool 18 and a notch 31 arranged in the entry end 29 of the fiber cleaver 10 become adjacent each other. The funnel shaped entry 28 may be diamond shaped, round, square, polygonal, arcuate, or combinations thereof.

When the optical fiber 26 is directed toward the funnel shaped entry 28, a tip of the optical fiber is guided toward an internal path 48 (FIG. 2) that may extend through the fiber cleaver 10. The funnel shaped entry 28 may at least provide a larger opening to insert the tip of the optical fiber in and facilitate insertion of the fiber optic cable 22 into the fiber cleaver 10.

A first clamp actuator 32 and a second clamp actuator 34 are arranged on an exterior of the fiber cleaver 10. The first and second clamp actuators 32, 34 may be depressed to allow the fiber optic cable 22 to be inserted into the fiber cleaver 10 and the first and second clamp actuators 32, 34 may be released to secure the fiber coating 24 along the internal path 48 prior to cleaving. The first and second clamp actuators 32, 34 articulate first and second clamps (FIG. 2), respectively. The placement of the first and second clamp actuators 32, 34 on the exterior 35 is such that the fiber cleaver 10 may be operated by either a right handed user or a left handed user. A linear actuator 36 is also arranged on the exterior 35 of the fiber cleaver 10 and may be actuated, or depressed, to cleave the fiber 26. It is anticipated that the first and second clamp actuators 32, 34 may be depressed and/or released with the user's forefingers and the linear actuator 36 may be depressed and/or released with the user's thumb of the same hand, or different hands if necessary. When the fiber 26 has been cleaved, a waste portion of the fiber that has been cleaved may easily be removed from a fiber exit 39 (FIG. 2) arranged proximate an exit end 37. The waste portion is removed after first releasing clamp 40 via actuator 34.

Figure 2:
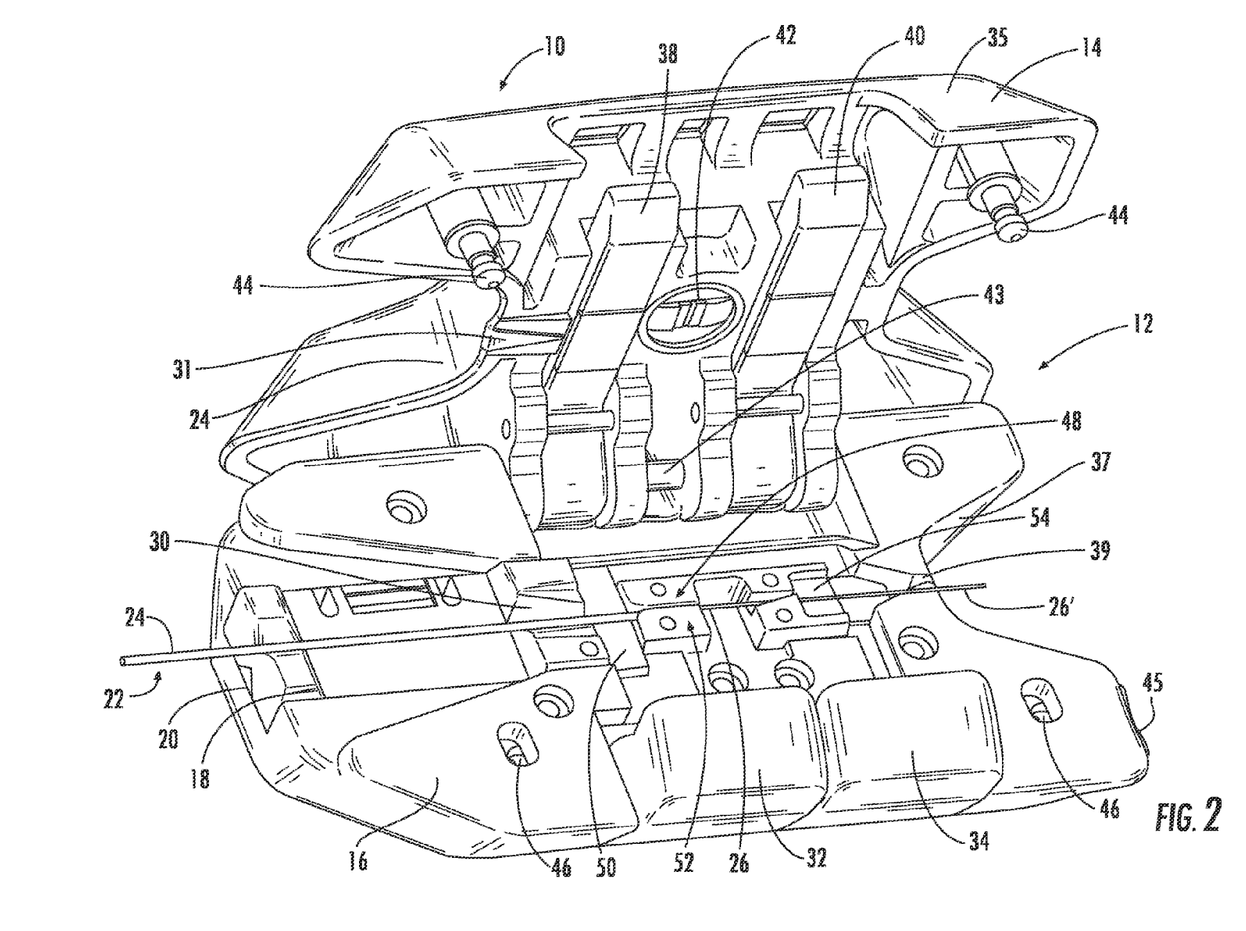
FIG. 2 is an isometric view showing the internal components and configuration of the fiber cleaver according to FIG. 1.

FIG. 2 is an isometric view showing the internal components and configuration of the fiber cleaver according to FIG. 1. As illustrated, the upper body 14 and the lower body 16 are hingedly open, similar to a "clam shell" type fiber cleaver. It is not intended that the upper body 14 and lower body 16 be open or separated as shown during use of the fiber cleaver 10. It may be necessary at times to open the fiber cleaver 10 as shown for cleaning, maintenance, or repair. The upper body 14 may be secured to the lower body 16 by a pinned hinge connection 43 at one side of the fiber cleaver and a plurality of locking pins 44 on either the upper or lower body 14, 16 that are inserted into respective locking pin receiving features 46 on the other body 16, 14 to secure the upper body 14 together with the lower body 16. The upper body 14 and lower body 16 may be opened by depressing a release button 45 arranged on the exterior 35 of the fiber cleaver 10.

A pair of clamps 38, 40 are arranged in the upper body 14 and an anvil 42 is arranged between the pair of clamps 38, 40. The pair of clamps 38, 40 articulate between a clamping position for clamping the optical fiber 26 extending along the internal path 48 and a retracted position displaced from the internal path 48 to insert the optical fiber 26 in the cleaving tool 10. When the upper body 14 and the lower body 16 are closed together, the first clamp actuator 32 will engage with clamp 38 and the second clamp actuator 34 will engage with clamp 40. Manipulation of the first and second clamp actuators 32, 34 will move their respective clamps 38, 40 between the clamping position and the retracted position. A clamping mechanism established by the clamp actuators 32, 34 and the clamps 38, 40 is but one of many clamping mechanisms that may be used to install and/or clamp the optical fiber 26 along the internal path 48. Any mechanism that at least functions to install and/or clamp the optical fiber 26 along the internal path 26 may be used, such as, for example, other lever or fulcrum configurations, pins or rods, mechanical fasteners, and combinations thereof.

The optical fiber 26 and coating 24 of the fiber optic cable 22 are inserted into the fiber cleaver 10 and guided along an internal path 48. The internal path 48 may be comprised at least of the channel 30 of the fiber handling tool 18, a first clamping surface 50 which is a face on the fiber handler 18, a fiber guide 52, a second clamping surface 54, and the fiber exit 39, where a waste portion 26' of the optical fiber 26 is removed.

When clamp 38 is in the clamping position, it will contact a portion of the first clamping surface 50 on fiber handler 18 and a portion of the fiber guide 52. Similarly, when clamp 40 is in the clamping position it will contact a portion of the second clamping surface 54 and a portion of the fiber guide 52. In their retracted positions, clamps 38, 40 are spaced above the first clamping surface 50, the fiber guide 52, and the second clamping surface 54 to create a space or gap between the clamps 38, 40 and the clamping surfaces 50, 54, respectively, and a gap between clamps 38, 40 and the fiber guide 52, thereby establishing a gap between the internal path 48 and the clamps 38, 40, to insert the optical fiber 26 on the path 48.

The fiber guide 52 may be spring actuated to allow movement of the fiber guide 52 from a loading position when the clamps 38, 40 are in their retracted position to a cleaving position when the clamps 38, 40 are in their clamping position. The ability of the fiber guide 52 to move from the loading position to the clamping position may allow clamps 38, 40 to clamp and secure the optical fiber 26 in place along the internal path 48 for cleaving.

Figure 3A:
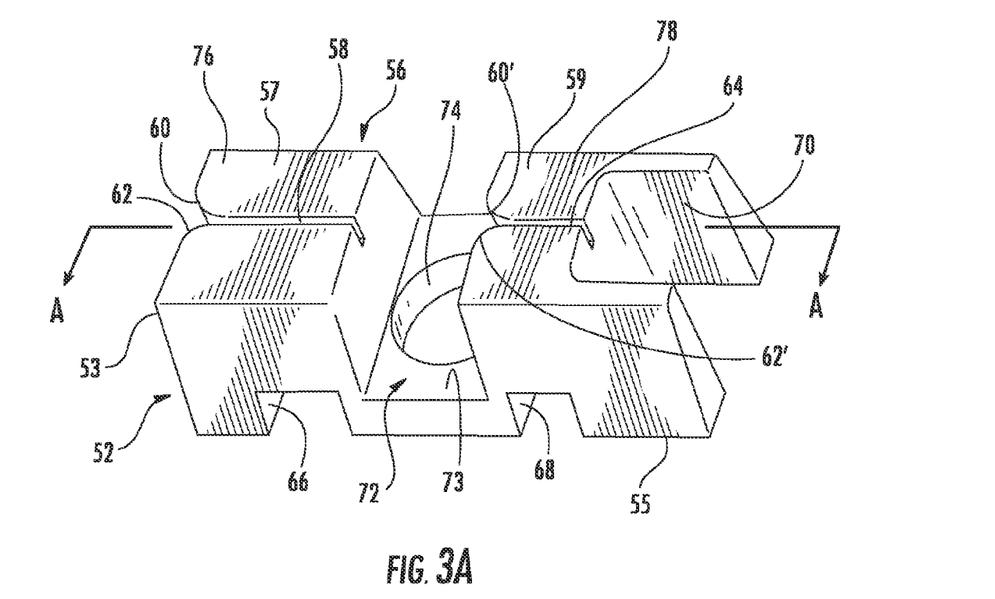
FIG. 3A is an isometric view showing a fiber guide of the fiber cleaver according to FIG. 1.

FIG. 3A shows an isometric view of the fiber guide 52 of the fiber cleaver 10 of to FIG. 1. The fiber guide 52 is a displaceable and may be able to move within the fiber cleaver 10. The fiber guide 52 may be comprised of a first end portion 57, a second end portion 59, and a mid portion 72 arranged between the first end portion 57 and the second end portion 59. Collectively, the first end portion 57, the second end portion 59, and the mid portion 72 form a fiber guide body 56. Two spring recesses 66, 68 may be arranged on a lower surface 55 of the fiber guide 52. The spring recesses 66, 68 may provide a location for springs, shown schematically as 52a, 52b, to be placed to "spring load" the fiber guide 52. The springs 52a, 52b may apply a restoring force in a direction toward the upper body 14 and may partially control the distance the fiber guide 52 may translate. The fiber guide 52 may translate between the loading position, which is a position where the springs 52a, 52b are at least partly holding the fiber guide 52 in place and a clamping position, which is a position where the springs 52a, 52b are compressed by the clamps 38, 40 contacting the fiber guide 52.

The first end portion 57 comprises a first face 76, which may be a substantially flat surface. The first end portion 57 also comprises a first guide slot 58 that may extend from the first face 76 into the first end portion 57 a predetermined distance. The first guide slot 58 may extend from a leading edge 53 of first end portion 57 to proximate the mid portion 72. A plurality of rounds (i.e., rounded surfaces) 60, 62 at the leading edge 53 of the first guide slot 58 flare outward to form a funnel through which the optical fiber 26 may traverse. The funnel helps direct and guide the optical fiber 26 as it is traveling along the internal path 48. The funnel may be established by any suitable geometry, such as, for example, chamfers, notches, fillets, and combinations thereof to name but a few.

The second end portion 59 comprises a second face 78, which may be a substantially flat surface. The second end portion 59 comprises a recess 70, which slidably mates or engages with the second clamping surface 54 of the fiber cleaver 10. The second end portion 59 may comprise a second guide slot 64. The second guide slot 64 may extend from the second face 78 into the second end portion 59 a predetermined distance and may extend from proximate the mid portion 72 to proximate the recess 70. A plurality of rounds 60', 62' may be arranged at an end of the second guide slot 64 proximate the mid portion 72. The rounds 60', 62' may flare outward to form a funnel through which the optical fiber 26 may traverse. The funnel may be established by any suitable geometry, such as, for example, chamfers, notches, fillets, and combinations thereof to name but a few. Rounds 60, 62 and rounds 60', 62' need not be the same size or shape. The first guide slot 58 and the second guide slot 64 may be a portion of the internal path 48.

The mid portion 72 comprises a bore 74 through which a scoring blade may traverse. The scoring blade may be oriented, aligned and guided by the bore 74. A mid portion face 73 may arranged on a different plane than the first and second faces 76, 78 of the first and second portions 57, 59, respectively and may provide clearance for the scoring blade to cleave the optical fiber 26. The mid portion 72 also functions as a structural link between the first end portion 57 and the second end portion 59.

Figure 3B:
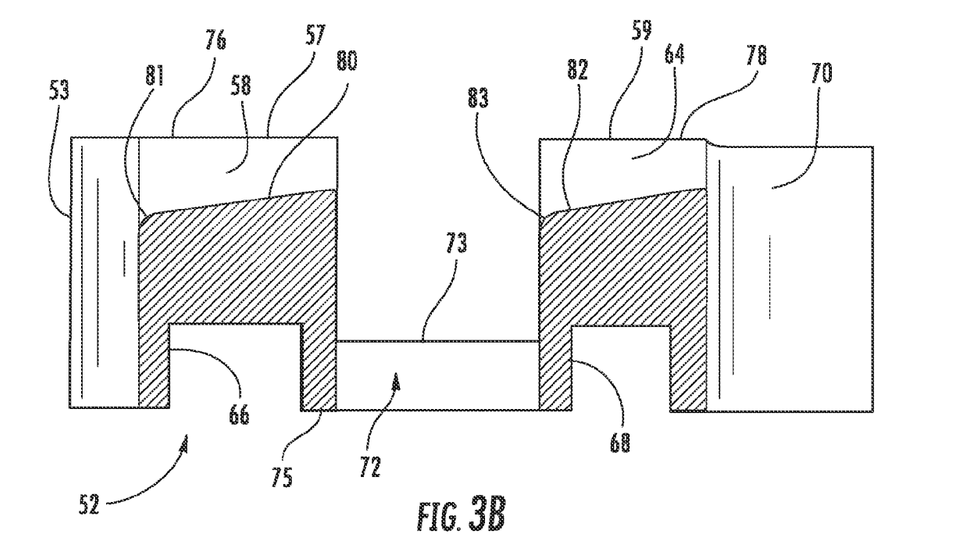
FIG. 3B is a cross-sectional view of Section A-A of the fiber guide of FIG. 3A.

FIG. 3B is a cross-sectional view of Section A-A of the fiber guide of FIG. 3A. Each of the guide slots 58, 64 may extend into the first and second end portions 57, 59 to a first and a second guide slot base 80, 82, respectively. The first and second guide slot bases 80, 82 may have a non-zero slope, relative to a base 75 of the fiber guide 52, with the slope increasing in the direction of optical fiber 26 movement (i.e. from the leading edge 53 toward the recess 70) through the fiber cleaver 10.

An optical fiber 26 may enter the fiber guide 52 with a preference to bend in a particular direction. With the first and second guide slot base 80, 82 having a rising slope in the direction of optical fiber 26 movement, the optical fiber 26 may have a reduced likelihood of diverging from the internal path 48. Furthermore, the funnels created by rounds 60, 62 and 60', 62' may function similarly to prevent the optical fiber 26 from diverging from the internal path 48 and guide the optical fiber 26 along the internal path 48. The first guide slot base 80 and the second guide slot base 82 may each further comprise a round or chamfer 81, 83, respectively. The round 81, 83 may also help guide the optical fiber 26 along the internal path 48.

Figure 4A:
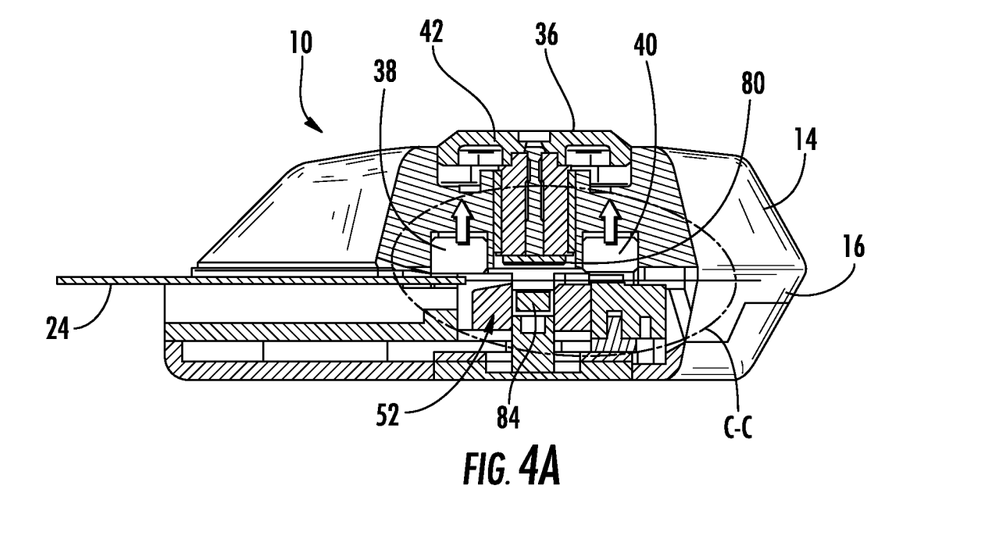
FIG. 4A is a cross-sectional view of Section B-B of the fiber cleaver according to FIG. 1.

FIG. 4A is a cross-sectional view of Section B-B of the fiber cleaver 10 according to FIG. 1. The relative positions between the anvil 42, the first and second clamps 38, 40, a scoring blade holder 84, and the fiber guide 52 can be seen. The anvil 42 is an element of the linear actuator 36 (FIG. 1) and is seen arranged between the first clamp 38 and the second clamp 40, all of which are arranged in the upper body 14 of the fiber cleaver 10. The scoring blade holder 84 and the fiber guide 52 are arranged in the lower body 16 of the fiber cleaver 10.

Figure 4B:
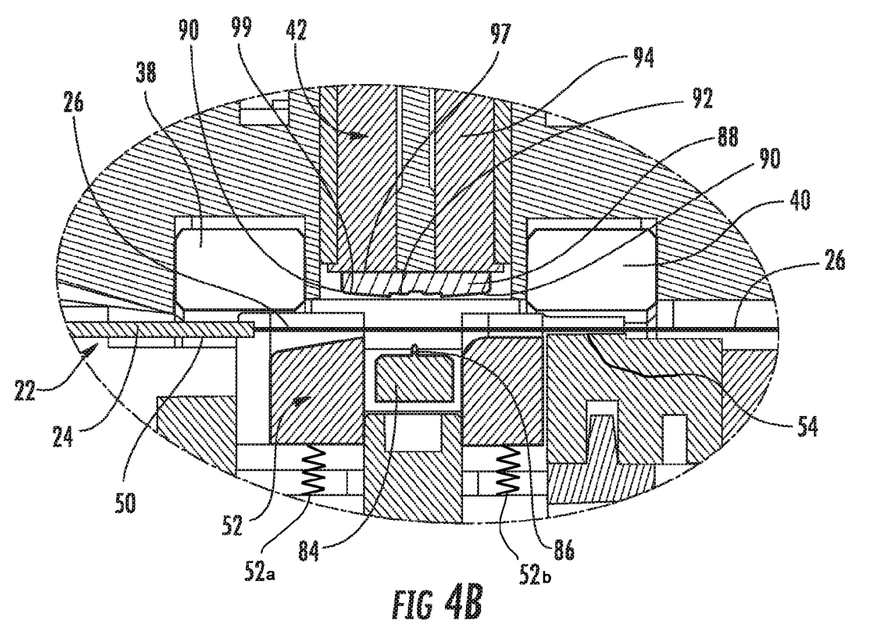
FIG. 4B is a view of Section C-C of FIG. 4A, showing in more detail the internal structure of the fiber cleaver with clamps in a retracted configuration to receive a fiber optic cable, with an anvil in an upward position.

In use, clamps 38, 40 move between the clamping position and the retracted position. FIG. 4B is a view of Section C-C of FIG. 4A and shows in more detail the internal structure of the fiber cleaver in the retracted configuration or position (i.e. a configuration to receive a fiber optic cable). With clamps 38, 40 in the retracted position, the fiber optic cable 22, and more particularly, the optical fiber 26, may be loaded into the fiber cleaver 10 and to a cleaving position. The fiber optic cable 22 may be inserted into funnel 28 (FIG. 1) and along the internal path 48. As the fiber optic cable 22 is advancing along the internal path 48, the fiber guide 52 is maintaining the optical fiber 26 along the internal path 48. An end of the coating 24 of the optical fiber 26 is halted from advancing along the internal path 48 when the coating contacts the rounds or chamfers 60, 62 of the fiber guide 52. The rounds or chamfers 60, 62 are sized and configured such that the coating 24 is halted at a predetermined distance from the scoring blade 86 so as to cleave the optical fiber 26 an appropriate length from the end of the coating. An appropriate length is understood by the skilled artisan to mean the length of optical fiber required for a given manufacturing operation, such as installation of a fiber connector. Different fiber guides 52 may be used having different sized rounds 60, 62 to halt a fiber optic cable 22 having a coating 24 having a different outer diameter. Thus, a variety of different fiber optic cable types (i.e. cables having optical fibers having different coating outer diameters) may be cleaved by substituting the fiber guide for a fiber guide sized appropriately for the particular cable.

In their retracted position, the clamps 38, 40 are articulated by depressing first and second clamp actuators 32, 34, which may move the clamps 38, 40 to a location spaced from the internal path 48. With the clamps 38, 40 spaced from the internal path 48, the fiber guide 52 will move to its loading position such that the weight of the fiber guide 52 is balanced by a spring force exerted by springs 52a, 52b, which are in contact with the fiber guide 52 and the lower body 16 of the fiber cleaver 10. The fiber cleaver 10 may now be able to receive the optical fiber 26 along the internal path 48.

Figure 4C:
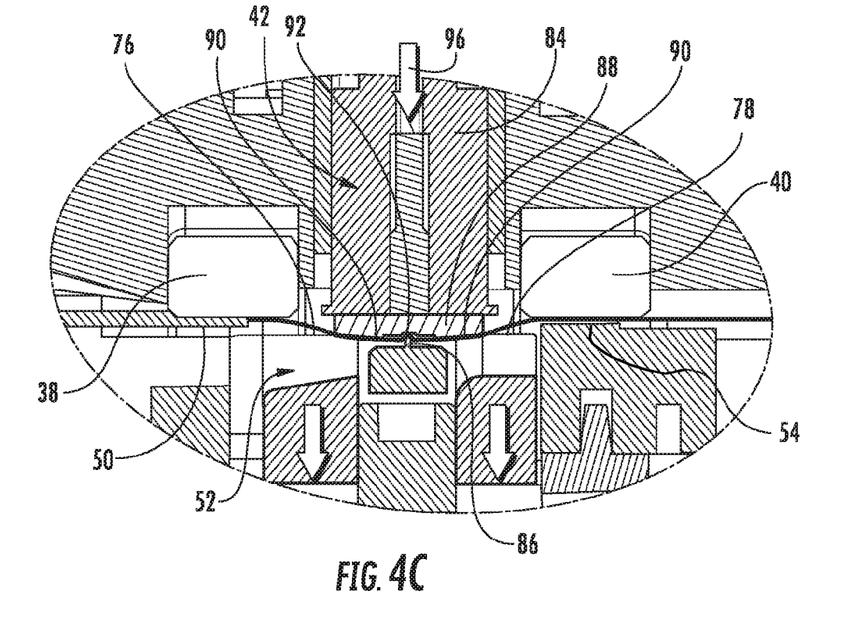
FIG. 4C is a view of Section C-C of FIG. 4A, showing in more detail the internal structure of the fiber cleaver with clamps in a clamping configuration to secure an optical fiber to be cleaved, with an anvil in a downward position.

With the optical fiber 26 arranged within the fiber cleaver 10 and along the internal path 48, the clamps may be articulated from their retracted position to their clamping position, by releasing the actuators 32, 34. FIG. 4C is a view of Section C-C of FIG. 4A, showing in more detail the internal structure of the clamps 38, 40 of the fiber cleaver 10 in a clamping configuration. Releasing the first and second clamp actuators 32, 34 will articulate the clamps 38, 40 into the clamped position. In the clamping configuration, the first clamp 38 may firmly rest on a portion of first clamping surface 50 and a portion of the first face 76 (FIG. 3A) of the fiber guide 52. In the clamping configuration, the second clamp 40 may firmly rest on a portion of the second clamping surface 54 and a portion of the second face 78 of the fiber guide 52. While in the clamping configuration, the clamps 38, 40 may provide a clamping force to the clamped portions of the first and second clamping surfaces 50, 54 and the clamped portions of the first and second faces 76, 78. The clamping force may result from a cantilevered type construction of the clamps 38, 40.

The anvil 42 may be selectively movable between a cleaving position and an inactive position by depressing and releasing the linear actuator 36, which may cause the anvil 42 to translate. The anvil 42 may have an anvil shaft 94 that may be cylindrical in shape and comprise an anvil head 88, with the anvil head 88 arranged proximate a distal end 97 of the anvil 42. In some embodiments, the anvil head 88 may have a body that extends into that anvil 42 for rapid replacement of the anvil head 88 or ease of manufacturing. The anvil head 88 may be circular in shape and may comprise a raised portion 90 having a recessed center 92. The raised portion 90 may have a contour or curvature 99. The contour 99 may facilitate cleaving the optical fiber 26 when the contour 99 contacts the optical fiber 26 and gently bows the optical fiber 26. A scoring blade 86 and the anvil 42 may be selectively movable into engagement with each other for cleaving the optical fiber 26 extending along the internal path 48.

When a force 96 is applied to depress the linear actuator 36, the anvil 42 may translate so the raised portion 90 contacts first face 76 and second face 78. This may cause the fiber guide 52 to also translate from the loading position to the cleaving position. As the fiber guide 52 translates, the first and second guide slots 58, 64 may be aligned to suspend a portion of the optical fiber 26 extending within the guide slots 58, 64 across the mid portion 72 of the fiber guide 52 and that is to be cleaved by the scoring blade 86.

The fiber guide 52 may translate an amount such that the first and second faces 76, 78 may lie in the same plane as the first and second clamping surfaces 50, 54 that may improve the clamping ability of the clamps 38, 40 against the optical fiber 26. The fiber guide 52 will translate until the contour 99 of the raised portion contacts the optical fiber 26 and begins to translate the optical fiber 26 toward the scoring blade 86. As the optical fiber 26 contacts the scoring blade 86, the optical fiber 26 may be urged toward the recessed center 92 of the anvil head 88 by the scoring blade 86 until the optical fiber 26 is cleaved. With the optical fiber 26 cleaved, the force 96 may be removed from the linear actuator 36 with the anvil 42 moving to the inactive position.

Clamp actuators 32, 34 may be depressed and the fiber optic cable 22 removed from the entry end 29 of the fiber cleaver 10 and the spent optical fiber 26' removed from the fiber exit 39 of the fiber cleaver.

Cleaving requires a 3-point bend in the cleaver. Points 1 and 2 are the clamping zones, and point 3 is the anvil which bends the fiber into the blade. In terms of contact, there are 4 contact points: Clamping zones 1 and 2, the anvil, and the blade. With reference to the fiber cleaver 10 disclosed herein, three point cleaving may be accomplished with two of the three contact points being established by contact between 1) the first clamp 38 contacting a portion of the first clamping surface 50 and 2) the second clamp 40 contacting a portion of the second clamping surface 54. The third contact point may be established by the anvil contacting the optical fiber 26 and bending it into the blade. The 3 point bend cleaving method is only relevant to this type of cleaver. There are many other methods/mechanisms to achieve a fiber cleave: tension, bending, etc. Cleavers of this type could also benefit from a fiber guide as described in the application.

The fiber cleaver 10 may be produced from a plastic or polymer that is easily extruded or injection molded. It is not required that the fiber cleaver be produced from a plastic or polymer and may be manufactured from any suitable material. Some components of the fiber cleaver 10 may be required to be manufactured from a more durable material or a harder material. For example, the scoring blade 86, the fiber guide 52, the first and second clamping surfaces 50, 54, and the first and second clamps 38, 40 may be manufactured from any suitable material, for example, the blade may comprise diamond or carbide, and the fiber guide may be a metalized thermoplastic material.

It will be apparent to those skilled in the art that various modifications to the present embodiment of the disclosure as described herein can be made without departing from the spirit or scope of the disclosure as defined in the appended claims. Thus, the disclosure covers the modifications and variations provided they come within the scope of the appended claims and the equivalents thereto. For example, the fiber clever has been used to describe the invention, however fiber devices can be, as further examples, in the form of tools, holders, fusion splice equipment, optical connectors, cable assemblies and installation equipment, and mechanical fiber splices. In addition, the fiber guide being displaceable can be caused by action other than the cleaver clamps, for example, an actuating mechanism attached to other movable parts of the fiber device. The fiber guide can be displaceable due to inherent material flexibility, such as a diaphragm or flexible tongue with a guiding slot. Moreover, the fiber guide can be hinged, instead of or in addition to being spring biased.

We claim:

1. A fiber cleaver comprising:
    a housing defining an internal path along which an optical fiber can extend;
    a scoring blade within the housing on one side of the internal path;
    an anvil within the housing on an opposite side of the internal path, the scoring blade and the anvil being selectively movable into engagement with each other for cleaving the optical fiber extending along the path;
    at least two clamps, each clamp associated with a cooperating clamping surface and being selectively movable between a clamping position for clamping the optical fiber extending along the path against the respective clamping surface and a retracted position displaced from the path and the respective clamping surface, the scoring blade being disposed between the clamps;
    a fiber guide disposed at least partially between the clamps and being formed with at least one guide section, the fiber guide being movable between a loading position wherein the path extends within the at least one guide section and a cleaving position wherein the at least one guide section is displaced from the path, wherein biasing structure biases the fiber guide toward the loading position;

the fiber guide being moved to its loading position when the clamps are moved to their retracted positions to guide the optical fiber through the housing within the at least one guide section and along the path; and the fiber guide being moved to its cleaving position when the clamps are moved to their clamping positions to suspend the optical fiber freely between the clamps to be cleaved when the scoring blade and the anvil are moved into engagement with each other.

2. The fiber cleaver of claim 1 and wherein the at least one guide section has an entry end and an exit end, and wherein the entry end is configured to guide an end of the optical fiber into the at least one guide section.

3. The fiber cleaver of claim 2 and wherein the entry end is formed with shapes that define a funnel.

4. The fiber cleaver of claim 2, wherein the optical fiber is part of a fiber optic cable, and wherein the entry end of the at least one guide section is for engaging a coating of the fiber optic cable that has been stripped from the optical fiber to limit movement of the optical fiber of the cable along the path.

5. The fiber cleaver of claim 1 and wherein the at least one guide section comprises two spaced apart and longitudinally aligned guide sections on opposite sides of the scoring blade.

6. The fiber cleaver of claim 5 and wherein each of the guide sections has an entry end configured to guide an end of the optical fiber into the respective guide section.

7. The fiber cleaver of claim 1 and wherein the pair of clamps partially engages the fiber guide as the clamps are moved to their clamping positions to urge the fiber guide from its loading position toward its cleaving position as the clamps move toward their clamping positions.

8. The fiber cleaver of claim 1 and wherein the housing is formed with a shaped opening to guide the optical fiber toward the at least one guide section.

9. The fiber cleaver of claim 1 and wherein the at least one guide section is selected from the group consisting of a slot, a groove, and a recess.

10. The fiber cleaver of claim 1 wherein the at least one guide section comprises two spaced apart and longitudinally aligned guide sections on opposite sides of the scoring blade, wherein each guide section comprises a guide slot having sides and a floor, and wherein the sides and the floor of each guide section taper outwardly at an entry end of their respective guide slot to direct an end of the optical fiber into the guide slot.

11. The fiber cleaver of claim 1, wherein the at least one guide section comprises a first guide section and a second guide section, wherein the fiber guide comprises a body having the first guide section at a first end portion thereof, the second guide section at a second end portion thereof, and a mid portion between the first guide section and the second guide section, and wherein the mid portion defines a bore through which the scoring blade extends.

12. The fiber cleaver of claim 11 wherein the first guide section defines a first elongated slot and the second guide section defines a second elongated slot, and wherein the first and second elongated slots are aligned.

* * * * *